Sept. 25, 1928.　　　　　　　　　　　　　　　　　　　　　　　1,685,517
H. G. BALDWIN
BEARING MOUNTING
Filed March 3, 1926

INVENTOR;
HARRY G. BALDWIN,
BY Gales P. Moore
HIS ATTORNEY.

Patented Sept. 25, 1928.

1,685,517

UNITED STATES PATENT OFFICE.

HARRY G. BALDWIN, OF NEW HAVEN, CONNECTICUT, ASSIGNOR TO THE NEW DEPARTURE MANUFACTURING COMPANY, OF BRISTOL, CONNECTICUT, A CORPORATION OF CONNECTICUT.

BEARING MOUNTING.

Application filed March 3, 1926. Serial No. 91,958.

This invention relates to bearing mountings for rotating members and comprises all the features of novelty herein disclosed, by way of example, as embodied in an antifriction bearing mounting and lubricating means for loose pulleys.

An object of the invention is to provide an improved mounting for loose pulleys and the like to reduce friction, wear and noise. Another object is to provide improved apparatus for insuring a constant and adequate supply of lubricant to the antifriction bearings of a high speed rotary member.

To these ends and to improve generally upon devices of the character indicated, the invention also consists in the various matters hereinafter described and claimed.

Figure 1:
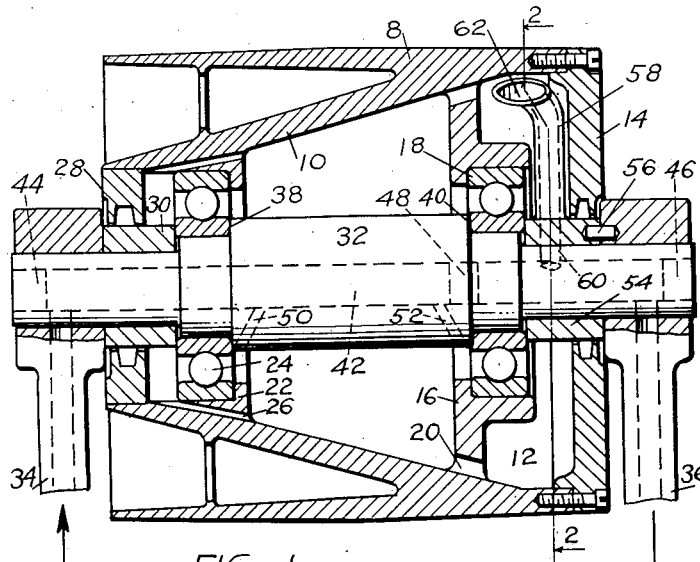
Figure 2:
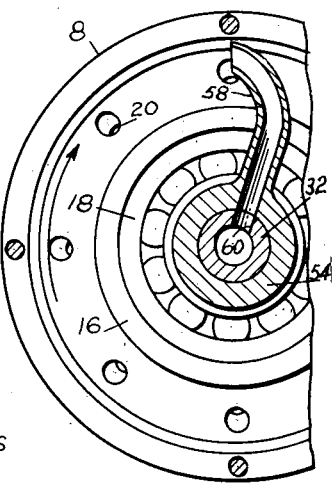

In the drawings, Figure 1 is a longitudinal central section of one form of the invention and Figure 2 is a transverse section on the line 2—2 of Figure 1.

Figure 3:
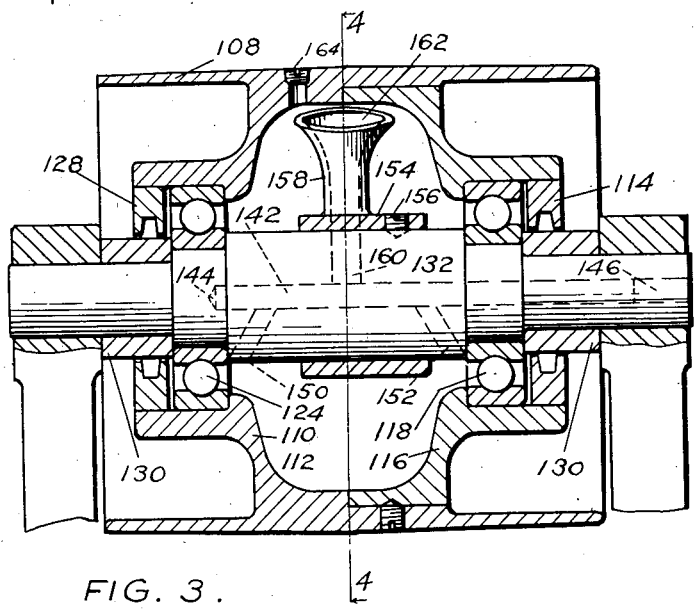
Figure 4:
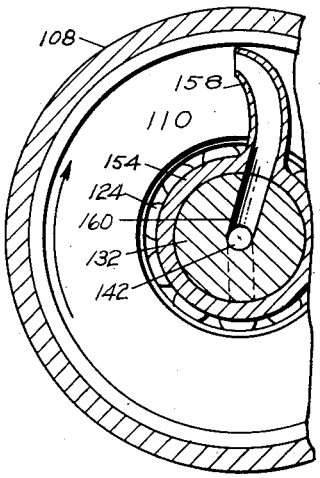

Figure 3 is a longitudinal central section of another form of the invention and Figure 4 is a section on line 4—4 of Figure 3.

Loose pulleys, such as those which have rockable mountings by which they can be used as belt tighteners, are usually more or less inaccessible and, although they rotate at high speed, little attention is paid to their mounting and the matter of lubrication. According to this invention, such pulleys are constructed to contain a supply of lubricant which is constantly circulated to antifriction bearings by the centrifugal force of rotation of the pulleys themselves.

The numeral 8 indicates a rotary member such as a loose pulley having an inner conical flange 10 which tends to cause a supply of lubricant to gravitate towards a lubricant collecting chamber 12 at one end. This end of the pulley is closed by a cap 14 bolted to the body and the lubricant collecting chamber is formed between this cap and an interior flange 16 which supports the outer race ring of an antifriction bearing 18 herein shown as having its rolling elements in the form of balls. Openings 20 at the base of the flange allow the lubricant to pass into the chamber. Another interior flange 22, near the other end of the pulley, forms a seat for the outer race ring of an antifriction bearing 24 and openings 26 in the flange allow the passage of lubricant. This end of the pulley is closed by a cap 28 which makes a tight joint with a collar 30 on a stationary supporting shaft 32.

The shaft 32 is mounted fixedly in hollow standards 34 and 36 which may be mounted to rock to press the pulley against a belt to tighten the latter. The shaft has shoulders 38 and 40 to form seats for the inner race rings of the antifriction bearings. The shaft has an interior central bore 42, in this case closed at the ends by plugs 44 and 46 and having a plug 48 to divide the bore into two compartments. Inclined passages 50 and 52 lead from one compartment of the bore to the bearings. Lubricant is delivered to the left compartment of the bore 42 through the hollow standard 34; the lubricant may be forced through the standard from a pump or from any other suitable outlet communicating with the force feed circulating system of a grinder or other machine on which the pulley is used. From the bore, the lubricant goes through the inclined passages 50 and 52 to the bearings and then works through the openings 20 and 26 to the collecting chamber 12.

To get the lubricant back into the circulating system by the centrifugal force of rotation of the pulley itself, the following mechanism is provided. A collar 54 surrounding the shaft is fixed by a pin 56 to the standard 36 and has a pipe or conduit 58 communicating by a radial passage 60 with the right hand compartment of the bore 42. The pipe extends outwardly from the collar and is curved transversely of the shaft in a direction opposite to the direction of rotation of the pulley. Its end is flattened out to provide a substantially elliptical mouth 62 near the periphery of the lubricant collecting chamber. It is obvious that centrifugal force will throw lubricant into the mouth of the pipe, and by reason of the curvature, the lubricant will flow smoothly down into the bore of the shaft and thence through the hollow standard 36 to the pump or circulating system.

In Figs. 3 and 4, a pulley 108 has a lubricant receptacle 112 formed by flanges 110 and 116 which carry antifriction bearings 118 and 120, the ends of the pulley being closed by caps 114 and 128 surrounding collars 130 on shaft 132. A central bore 142, extending from a closing plug 146 to the point 144, communicates with the bearings through passages 150 and 152, and a passage 160 connects the bore with a curved pipe 158. The pipe has a collecting mouth 162 and is fastened to the shaft by a collar 154 and set-screw 156. Lubricant is supplied at the plug 164.

The form shown in Figures 1 and 2 can be easily converted to a self contained lubricant circulating pulley similar to Figures 3 and 4 by removing the plug 48 and driving the plugs 44 and 46 into the bore far enough to cut off communication with the hollow standards 34 and 36.

Although the invention has been disclosed by reference to certain specific constructions, it is not, in its broader aspects, necessarily limited to the forms selected for mere illustrative purposes.

I claim:

1. In a bearing mounting, a shaft having a central bore, a rotary member having a lubricant collecting chamber therein, bearings between the shaft and the rotary member, means for directing lubricant from the bore in the shaft to the bearings, hollow standards supporting the shaft and communicating with the bore in the shaft, plugs for closing the ends of the bore or cutting off communication of the bore with the hollow standards, a removable plug for dividing the bore into compartments, and means for delivering lubricant from the lubricant collecting chamber to the bore; substantially as described.

2. In a bearing mounting, a shaft having a central bore, a rotary member having a lubricant collecting chamber at one end, antifriction bearings between the shaft and the rotary member, said shaft having lubricant passages for directing lubricant from the bore in the shaft to the bearings, hollow standards supporting the shaft and communicating with the bore to conduct lubricant to one end of the bore and remove it from the other, a plug dividing the bore into compartments, a pipe communicating with said bore at the side of said plug opposite the passages, said pipe extending outwardly and opening into the lubricant chamber; substantially as described.

3. In a bearing mounting, a shaft having a central bore, a rotary member having an inner substantially conical face and a lubricant collecting chamber near the larger end of said face, bearings between the shaft and the rotary member, said shaft having means to conduct lubricant to the bearings from the bore, a pipe fixed on the shaft and having a portion curved laterally of the shaft and extended to the periphery of said lubricant chamber, means for dividing the bore into compartments, and means for conducting lubricant to one compartment of the bore and removing it from the other; substantially as described.

In testimony whereof I hereunto affix my signature.

HARRY G. BALDWIN.